United States Patent
Azami et al.

(10) Patent No.: US 9,594,988 B2
(45) Date of Patent: Mar. 14, 2017

(54) PRINTING SYSTEM, PRINTING CONTROL APPARATUS, PRINTING APPARATUS AND METHOD FOR GENERATING A BAND COMPRESSED IMAGE DATA AND PRINT COMMAND INCLUDES SELECTION OF OMITTING UNTRANSMITTED DATA SET

(71) Applicant: SEIKO EPSON CORPORATION, Tokyo (JP)

(72) Inventors: Osamu Azami, Nagano (JP); Yasushi Otaki, Nagano (JP); Yasuyoshi Fujimori, Hokkaido (JP); Shinji Nozawa, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/016,903

(22) Filed: Feb. 5, 2016

(65) Prior Publication Data

US 2016/0232433 A1 Aug. 11, 2016

(30) Foreign Application Priority Data

Feb. 9, 2015 (JP) .................................. 2015-022981

(51) Int. Cl.
*H04N 1/38* (2006.01)
*H04N 1/62* (2006.01)
*G06K 15/02* (2006.01)
*G06F 3/12* (2006.01)

(52) U.S. Cl.
CPC ....... *G06K 15/1807* (2013.01); *G06F 3/1214* (2013.01); *G06F 3/1244* (2013.01); *G06F 3/1285* (2013.01)

(58) Field of Classification Search
None
See application file for complete search history.

(56) References Cited

U.S. PATENT DOCUMENTS

| 2008/0101706 | A1* | 5/2008 | Maeda | H04N 1/41 382/232 |
| 2011/0058218 | A1* | 3/2011 | Hane | G06F 3/1213 358/1.15 |
| 2012/0113466 | A1* | 5/2012 | Luttmer | H03M 7/3086 358/1.15 |

FOREIGN PATENT DOCUMENTS

JP 2011-193210 A 9/2011

* cited by examiner

*Primary Examiner* — Benny Q Tieu
*Assistant Examiner* — Haris Sabah
(74) *Attorney, Agent, or Firm* — Global IP Counselors, LLP

(57) ABSTRACT

The printing control apparatus compares, when printing a bit image, a data set of a transmitted compressed image data to a data set of an untransmitted compressed image data, omits transmission of the data set in the subsequent compressed image data when the data sets coincide with each other, and notifies the printing apparatus that transmission of the data set has been omitted with setting in a printing command. The printing apparatus holds the compressed image data in which the data set has been omitted, and, when it is notified that transmission of the part of the data set has been omitted, generates the bit image by reusing a part of the already existing data set and developing the held compressed image data.

6 Claims, 12 Drawing Sheets

PRINTING SYSTEM, PRINTING CONTROL APPARATUS, PRINTING APPARATUS AND METHOD FOR GENERATING A BAND COMPRESSED IMAGE DATA AND PRINT COMMAND INCLUDES SELECTION OF OMITTING UNTRANSMITTED DATA SET

BACKGROUND

1. Technical Field

The present invention relates to a printing system that performs a printing process by using a printing command, a printing control apparatus, a printing apparatus, a printing method, and a printing program.

2. Related Art

Improvement of printing resolution accompanies an increase in the size of printing data. This phenomenon is specifically remarkable when printing image data. In printing of image data, this tendency is specifically remarkable.

In the case of transmitting printing data from a printing control apparatus such as a computer to a printing apparatus such as a printer to print the printing data, if the time required for transmitting the data is longer than the time required for printing, the printing is interrupted. Therefore, the efficiency thereof is not good. In order to shorten the time required for transmitting the data, the data is transmitted by performing a compression process on the image data.

When printing using compressed image data, it is necessary to prevent image quality deterioration. For this reason, the data has been transmitted by using lossless compression as the compression process.

Meanwhile, as the compression process, there is also a lossy compression method. According to lossy compression, it can be generally expected that the compression ratio is great and the time required for transmitting the data is also shortened.

According to JP-A-2011-193210, there is disclosed a printing control apparatus in which both lossless compression and lossy compression are used.

In the lossy compression method, a predetermined data set is required when compressing or developing. In the case of JPEG, as the data set, Huffman table or the like is required as essential segment information.

If the data to be compressed is in a page unit, the size itself of the Huffman table does not become a problem. However, in the case of performing the printing process in which an intermediate code is generated by performing the printing process for every band of the page, a bit image to be transmitted becomes smaller, and the size of the Huffman table cannot be ignored.

That is, essentially, even when applying the process of lossless compression, in which an increase of the compression ratio can be expected, an increase in data transmission speed cannot be realized.

SUMMARY

An advantage of some aspects of the invention is to increase the data transmission speed.

According to an aspect of the invention, there is provided a printing system that outputs a printing command from a printing control apparatus to a printing apparatus, in which, a printing process is performed for each band of a page on a bit image, compressed image data is transmitted from the printing control apparatus to the printing apparatus in response to the bit image, the compressed image data includes image data subjected to lossy compression so as to be developed by using a predetermined data set, and the predetermined data set, the printing command includes a selection of omitting the data set, the printing control apparatus includes a section for comparing a data set of the transmitted compressed image data to a data set of the untransmitted compressed image data when printing the bit image, a section for omitting transmission of the data set in the subsequent compressed image data when the data sets coincide with each other, a section for notifying the printing apparatus that transmission of the data set has been omitted, and the printing apparatus includes a section for holding the compressed image data in which the data set has been omitted, and a section for generating the bit image by developing the image data of the held compressed image data by reusing the already existing data set when it is notified that transmission of the data set has been omitted.

In such a configuration, in response to the bit image to be printed, the compressed image data that includes a predetermined data set is generated, and image data subjected to lossy compression so as to be developed by using the predetermined data set. By transmitting the compressed image data from the printing control apparatus to the printing apparatus, the printing process is performed for each band of the page on the bit image. In such a printing process, the printing command is output and represented from the printing control apparatus to the printing apparatus. Moreover, it is possible that the printing command includes the selection of omitting the data set.

First, the printing control apparatus compares a data set of the transmitted compressed image data to a data set of the untransmitted compressed image data when printing the bit image. In addition, transmission of the data set in the subsequent compressed image data is omitted when the data sets coincide with each other. That is, the printing command is transmitted, which includes only the image data and from which the data set is omitted. Here, the printing apparatus is notified that transmission of the data set has been omitted.

Meanwhile, when the compressed image data from which the data set is omitted is received, the printing apparatus holds the compressed image data, and, generates the bit image by developing the image data of the held compressed image data by reusing the already existing data set when it is notified that transmission of the data set is omitted.

That is, if the data set of the previous compressed image data and the data set of the subsequent compressed image data coincide, transmission of the data set is omitted, and when generating a bit image, the data set of the previous already existing compressed image data is reused to generate the bit image from the subsequent compressed image data. Thereby, the same data set is not transmitted repeatedly.

When omitting the data set, the entire data set may be omitted, or a part of the data set may be omitted.

That is, the printing command enables a selection of omitting the part of the data set, the printing control apparatus omits transmission of a part of the data set in the subsequent compressed image data when a part of the data set in the transmitted compressed image data and a part of the data set in the untransmitted compressed image data which have been subjected to the lossy compression process, coincide with each other, and the printing apparatus generates the bit image by developing the held compressed image data by reusing a part of the data set which is to be transmitted and a part of the transmitted data set when it is notified that transmission of the part of the data set has been omitted.

There is also a case in which the part of the data set in the untransmitted compressed image data, and coincides with the part of the transmitted compressed image data, and the remaining part of each of the compressed image data does not coincide with each other. If the coinciding part is set to be not transmitted, the same data set is not transmitted repeatedly.

The printing command is capable of including the data set without including the image data.

If only the common data set is transmitted from the printing control apparatus to the printing apparatus, it is possible to reuse the data set.

It is also possible that the printing apparatus includes a versatile data set in advance.

As an example, the printing apparatus includes the data set, and the printing control apparatus compares the data set of the compressed image data subjected to the lossy process, and the data set included in the printing apparatus, and, when the data sets coincide, omits the data set in the compressed image data.

If the versatile data set is included in the printing apparatus, with regard to the image data in which a data set coinciding with the data set is used, it is possible to develop the data set into a bit image at the printing apparatus side without transmitting the data set. That is, the data set is not transmitted.

The embodiment is not limited to lossy compression being superior in every case.

For this reason, the printing control apparatus determines whether or not the bit image subjected to the printing process for every band of the page satisfies a predetermined condition, and, in the case where the condition is satisfied, is capable of transmitting the compressed image data subjected to the lossy compression process to the printing apparatus.

In such a configuration, when performing the printing process for every band of the page is presumed, it is also possible to set the condition whether or not performing the lossy compression process on the image data contributes to a faster transmission speed. Only when the bit image satisfies such a condition, can the bit image be subjected to the lossy compression process, and transmitted to the printing apparatus.

Meanwhile, there is also a case where such a printing system exists as the combination of the printing control apparatus and the printing apparatus, and it is also possible to realize the apparatuses independently and separately.

In addition, if focusing on each step that such a printing system performs, the invention is also evidently established as a printing method.

Moreover, the idea of the invention is not limited thereto, and the invention includes various embodiments, such as being used in combination with a certain apparatus. Therefore, the invention can be suitably changed, such as being used as software or hardware.

It is needless to say that an example for realizing the idea of the invention also evidently exists and is used as a printing program that causes a computer to execute a predetermined function to construct the printing system.

Moreover, also in the case where the invention is realized as software in part and hardware in part, the idea of the invention therein does not entirely differ, and it may be also realized as an embodiment in which a part is held on a recording medium and is suitably read when needed.

When realizing the invention as software, it is also possible to use hardware or an operating system, and it is also possible for it to be realized in a completely different way from the software. For example, with regard to realizing various computing processes, it is possible to perform the processes by calling a predetermined function in the operating system, and it is also possible to input the processes from hardware without calling the function. In addition, even if the invention is realized through the operating system in actuality, it is possible to understand that the invention can be embodied only by such a program.

According to the printing system, the printing control apparatus, the printing apparatus, the printing method, and the printing program of the invention, the data set required for developing the compressed image data subjected to the lossy compression process is not repeatedly transmitted, and it is possible to realize much better efficiency in the data transmission. Specifically, in the case of performing the printing process for every band of the page on the bit image, such an effect is remarkable.

BRIEF DESCRIPTION OF THE DRAWINGS

The invention will be described with reference to the accompanying drawings, wherein like numbers reference like elements.

DESCRIPTION OF EXEMPLARY EMBODIMENTS

The embodiments of the invention will be described with reference to the drawings.

Figure 1:
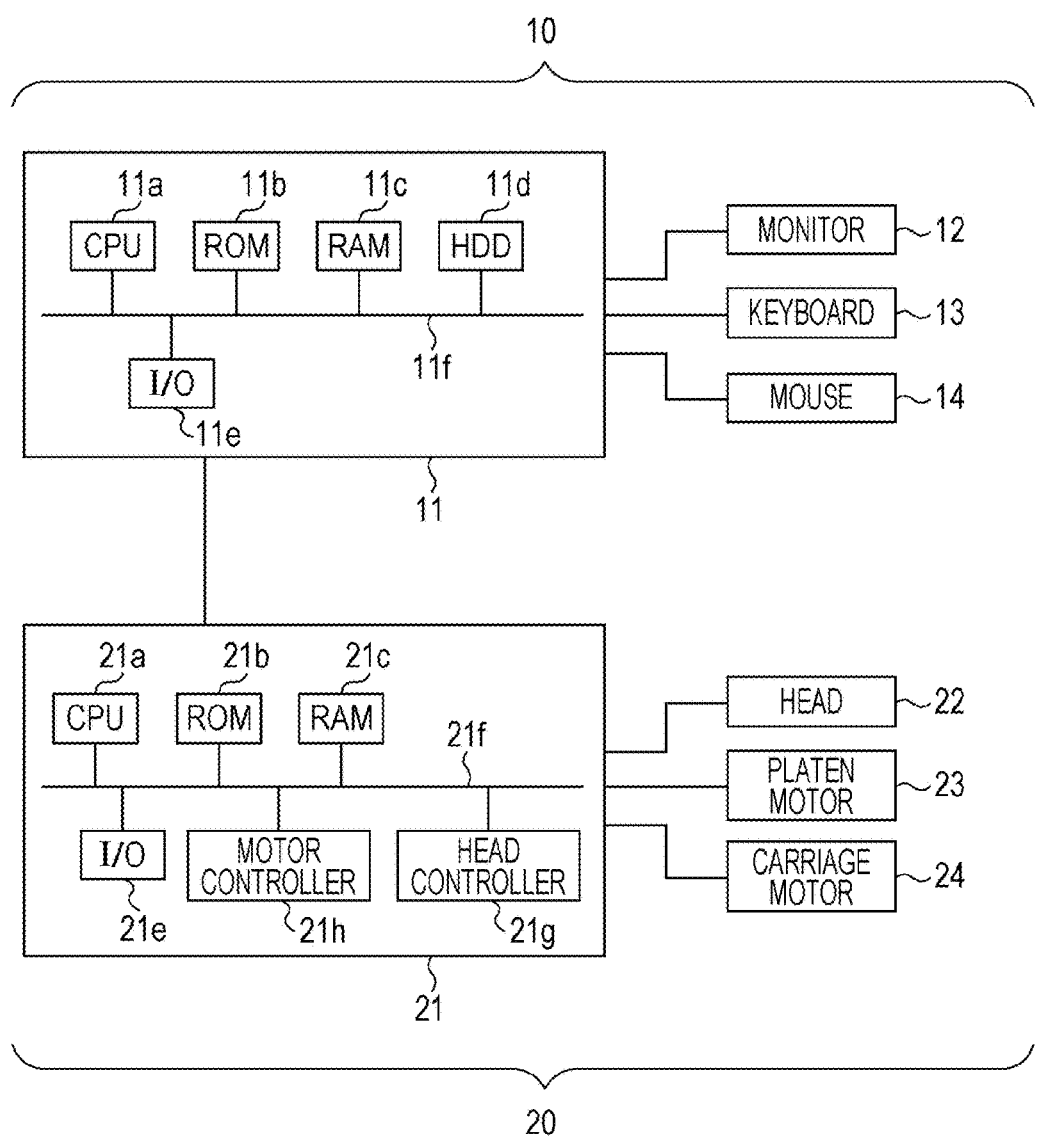
FIG. 1 is a schematic block diagram of a printing system.

FIG. 1 is the schematic block diagram of the printing system.

In FIG. 1, a printing control apparatus 10 as a computer includes a CPU 11a, a ROM 11b, a RAM 11c, a hard disk (HDD) 11d, an interface (I/O) 11e, a bus 11f, and the like inside a main body 11. In addition, as an exterior apparatus, a monitor 12, a keyboard 13, and a mouse 14 are connected. The exterior apparatuses and a printing apparatus 20 to be described hereinafter are connected to the main body 11 through the interface 11e, and also to a network through the same interface 11e.

A printing apparatus 20 also includes a basic computer inside a control a section 21, and includes a CPU 21a, a ROM 21b, a RAM 21c, an interface (I/O) 21e, a bus 21f, and the like. The control a section 21 controls a head 22, a platen motor 23, and a carriage motor 24, and includes a head controller 21g that electrically controls the driving of the head 22, and a motor controller 21h that electrically controls the driving of the platen motor 23 and the carriage motor 24.

The printing apparatus 20 is directly connected to the printing control apparatus 10 through the interface 21e. However, it is possible that the printing apparatus 20 is connected to the printing control apparatus 10 through the interface 21e via a network.

A program in which a predetermined function is realized in the printing control apparatus 10 is held in a hard disk 11d and the ROM 11b, and is executed after being read by the RAM 11c when executed. Meanwhile, a program in which a predetermined function is realized in the printing apparatus 20 is held in the ROM 21b, and is executed after being read by the RAM 21c when executed. In addition, the holding space of the program is not limited thereto, and the program may be loaded through a network, or read from an exchangeable memory element or the like.

Figure 2:
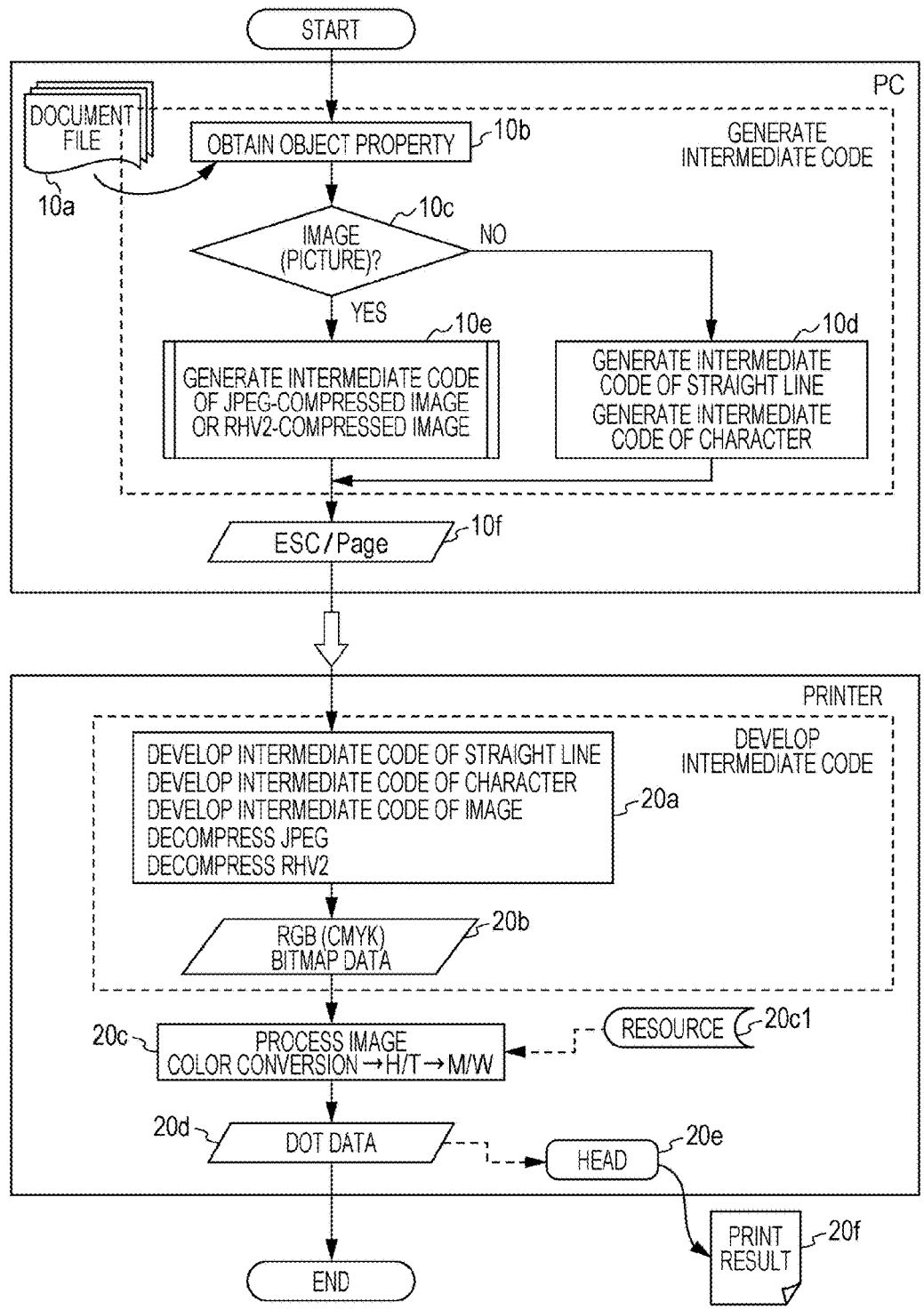
FIG. 2 is a block diagram that illustrates processing of data of the printing system.

FIG. 2 is the block diagram that illustrates the processing of the data of the printing system.

Such a printing system performs printing by outputting a printing command from the printing control apparatus 10 to the printing apparatus 20. Inside the printing control apparatus 10, in the case of printing a document, an intermediate code is generated based on a document file 10a. As for the document, a character, a straight line (figure), an image (picture), or the like is included, each of which is an object, and an object characteristics is allocated thereto for distinguishing the type of each object. In order to generate the intermediate code, first, the object character of each object of the document file 10a is obtained (a process 10b), and it is determined from the characteristics whether the object is an image (picture) (a process 10c). The process is divided for an image (picture) subjected to compression, and a character or a straight line (figure) not subjected to compression, and, in the case of the character or the straight line (figure), a general process is performed to generate the intermediate code of the straight line or the character (a process 10d). Meanwhile, with regard to the image (picture) subjected to lossless compression, after the selection is made between lossless compression (repeated Huffman compression process (RHV2)) and JPEG compression, which is lossy compression, the compression process is performed to generate the intermediate code of the image (a process 10e). That is, compressed image data is generated. Next, based on the intermediate code, by the description language (for example, ESC/Page language) for printing control, a printing command generating process 10f is performed.

Meanwhile, inside the printing apparatus 20, after the printing command is received, the intermediate code included in a printing code is developed. The intermediate code is generated based on an image, in addition to a character or a straight line. Therefore, an intermediate code generating process 20a of a character, a straight line, and an image is performed. When developing the intermediate code of an image, after determining whether the compression process is lossless compression (repeated Huffman compression process (RHV2)) or JPEG compression, which is lossy compression, a developing process in response to each compression process is performed.

Developing the intermediate code a section generating a bitmap data 20b at a developing buffer for each color of RGB (red, green, and blue), or CMYK (cyan, magenta, yellow, and black) according to the document file 10a, and thereby the developing process of the intermediate code is terminated. In addition, hereinafter, the bitmap data 20b is called a bit image.

Next, in response to specific printing hardware (color ink and head, carriage feed, and paper feed) of the printing apparatus 20, printing data is generated for every roaster.

Specifically, a process 20c including a color converting process for color ink, a halftone process, a microwave process for high-quality printing, or the like is performed. Here, required data is provided as resource 20c1. Since dot data 20d is generated in response to a head 20e in this state, the head 22, the platen motor 23, and the carriage motor 24 are driven via the head controller 21g or the motor controller 21h, and a pixel in response to the dot data is generated and drawn on a printing medium. If the dot data is drawn, a printing result 20f is obtained.

Here, the format of JPEG compression, which is lossy compression, will be described.

Figure 3:
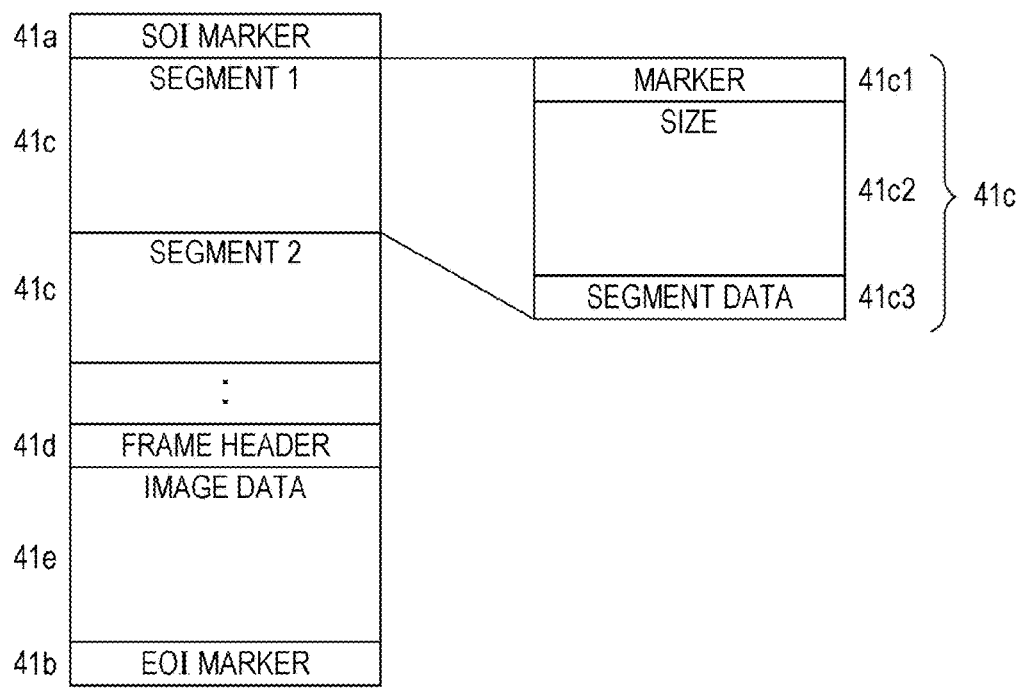
FIG. 3 is a diagram that illustrates a JPEG format.
Figure 4:
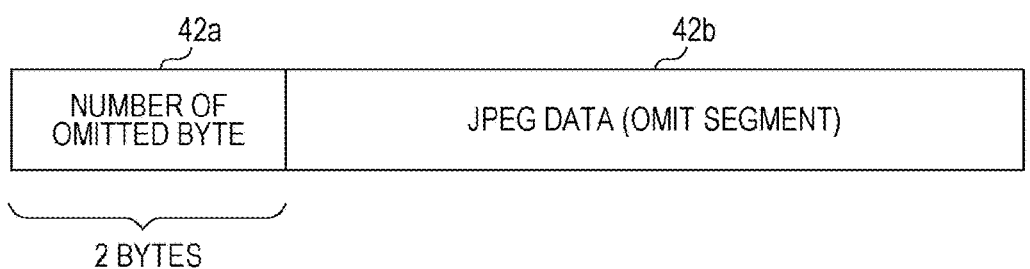
FIG. 4 is a diagram that illustrates a format of data from which JPEG essential segment information is omitted.

FIG. 3 is a diagram that illustrates the JPEG format, and FIG. 4 is a diagram that illustrates the format of the data from which the JPEG essential segment information is omitted.

The JPEG format is defined in ITU-T Recommendation T. 81, ISO/IEC 10918: 1994, and JISX 4301.

As illustrated in FIGS. 3 and 4, the JPEG format is a group of data including an SOI marker 41a in the head, and an EOI marker 41b in the foot. A plurality of segment data 41c is housed subsequent to the SOI marker 41a, and, in each segment data 41c, a marker 41c1 is included in the head, the size of the segment data is written as a size 41c2, and segment data 41c3 is stored. The foot of the segment data 41c is identified by the marker 41c1 and the size 41c2. A frame header 41d is arranged subsequent to the end of the segment data 41c. Next, an image data 41e is housed, and, in the foot thereof, the EOI marker 41b is housed.

In JPEG compression, a quantization technique is used. A table of parameters for quantization does not depend on the size of an image. That is, the size of the table of the parameters required for determining compression ratio or the like is set, and the table of the parameters is recorded as segment data. The segment data of the parameters table is essential for developing the image data, and called the essential segment information.

In this embodiment, JPEG compression is applied as lossy compression. However, lossy compression is not limited to JPEG compression, and any compression technique in which a certain data set required independently of the image data such as the essential segment information can be applied. In this manner, the data set indicates a group of data required for the compression process independently of the image data.

Therefore, in JPEG compression, there is a case where the essential segment information is common. In addition, in the case of printing the bit image for every band of the page, the size of the bit image itself is small in the first place, and the size of the segment data of the essential segment information is bigger. For this reason, in the case where the essential segment information is common between the pieces of the compressed image data subjected to JPEG compression, transmission of the essential segment information is omitted.

When referring to the JPEG format in FIG. 3, there is no information that indicates the length of the compressed image data in the head area. Therefore, even when the common portion is transmitted only once, and the head portion common in the subsequent compressed image data is entirely omitted, inconsistency of the data is not caused. For this reason, as illustrated in FIG. 4, two bytes of an area 42a is prepared where the number of the bytes omitted in the head is recorded. Next, the JPEG data is held in a remaining area 42b to be transmitted. At the reception side, it is possible to detect the number of the omitted bytes by obtaining the two bytes in the head. In this case, by the number of the omitted bytes, the data from the head of the compressed image data which is previously transmitted is acquired, and added to the head in the omitted side, and thereby it is possible to reproduce the original compressed image data.

Figure 5:
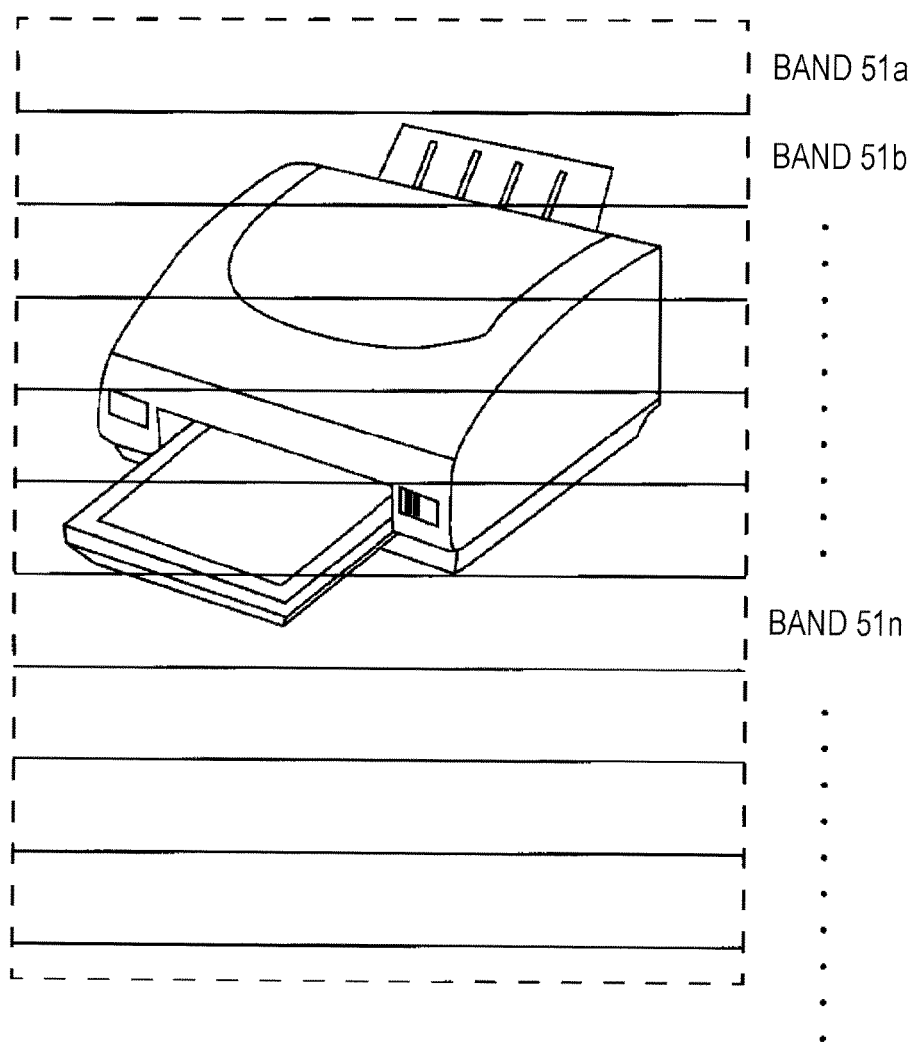
FIG. 5 is a diagram that illustrates a specific example of performing a printing process for every band of a page.

FIG. 5 is the diagram that illustrates the specific example of performing the printing process for every band of the page.

When printing one piece of printing material, the entire material is not processed at one time, but is fragmented in a paper feeding direction, and the each area divided in the direction intersecting to the paper feeding direction is called bands 51 (51a to 51n). In the case of this printing system, even an object is grouped in an original printing document, the object is printed by being divided for every band. An image of one printer illustrated in the same drawing is drawn by one piece of bitmap data in the printing source document. However, for every band divided in the horizontal direction in the printing process, one piece of bitmap data is designated as an object for every rectangular area in which a relative position is designated in the band thereof, and, through a process illustrated in FIG. 2, continues to be generated as the dot data 20d for printing. By being divided for every band, the size of the rectangular area in which the relative position is relatively designated is comparatively small.

Figure 6:
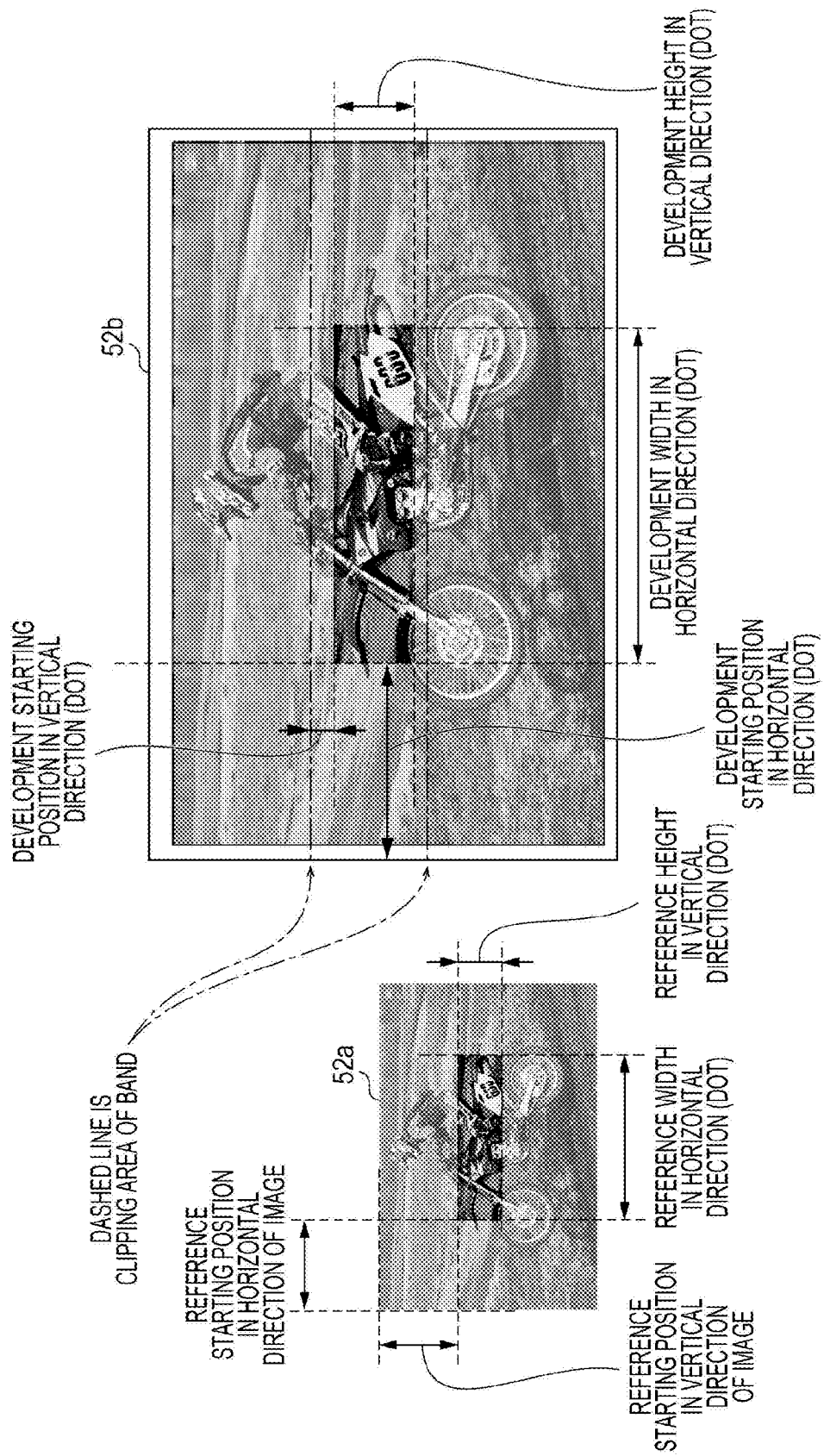
FIG. 6 is a diagram that illustrates a printing position in the case of printing a bit image by band of a page.

FIG. 6 is the diagram that illustrates the printing position in the case of printing the bit image by band of a page.

As a designated example of the relative position inside a band, in a document 52a as a printing source, a reference starting position in the vertical direction and a reference starting position in the horizontal direction are designated as standard points, moreover, a reference height in the vertical direction and a reference height in the horizontal direction are designated, and thereby, it is possible to designate the rectangular area as a referring source. In addition, a development starting position in the vertical direction and a development starting position in the horizontal direction on a printing medium 52b are designated as standard points, moreover, a development height in the vertical direction and a development height in the horizontal direction are designated, and thereby the rectangular area to be printed is designated, and the dot data 20d is generated so as to enlarge or contract the rectangular area as a referring source as required. Moreover, with regard to a coordinate in the vertical direction, a coordinate of the offset at the document 52a as the printing source is converted to the relative position inside each band on the printing medium 52b. For example, the reference starting position in the vertical direction in the document 52a as the printing source is a coordinate from the upper side of a figure. However, the development starting position in the vertical direction in the printing medium 52b is a coordinate from the upper side of a band. In addition, the designation of the position or the length is not limited to one example, and may be changed for effective application in an actual case.

Hereinafter, a printing process of transmitting the compressed image data subjected to JPEG compression from the printing control apparatus 10 to the printing apparatus 20 will be described. As described above, the printing of the bit image is performed for every band of the page, and the printing command is transmitted from the printing control apparatus 10 to the printing apparatus 20. That is, in response to the bit image of every band, the compressed image data is transmitted from the printing control apparatus 10 to the printing apparatus 20.

Figure 7:
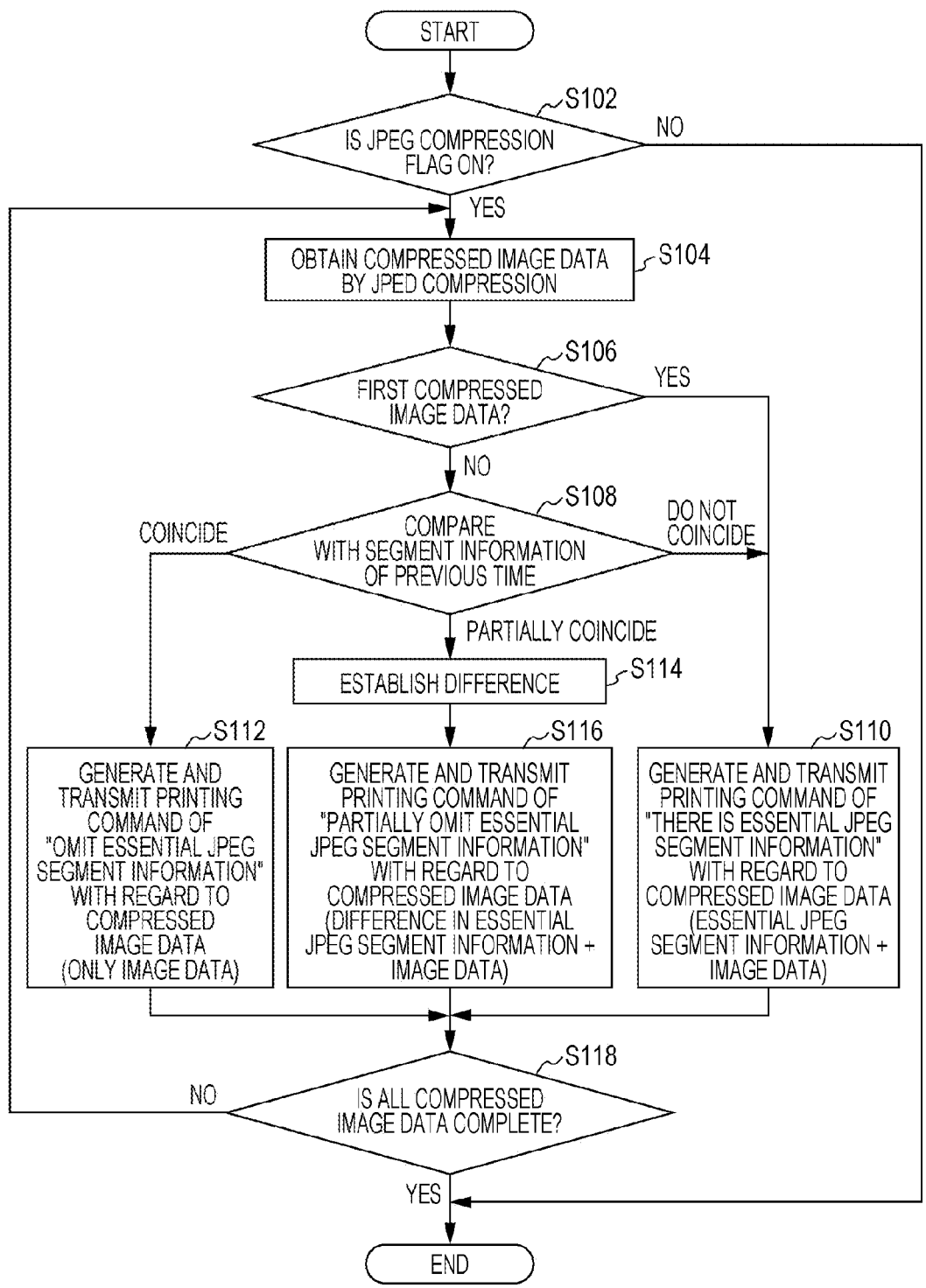
FIG. 7 is a main flowchart of a printing control apparatus.
Figure 8:
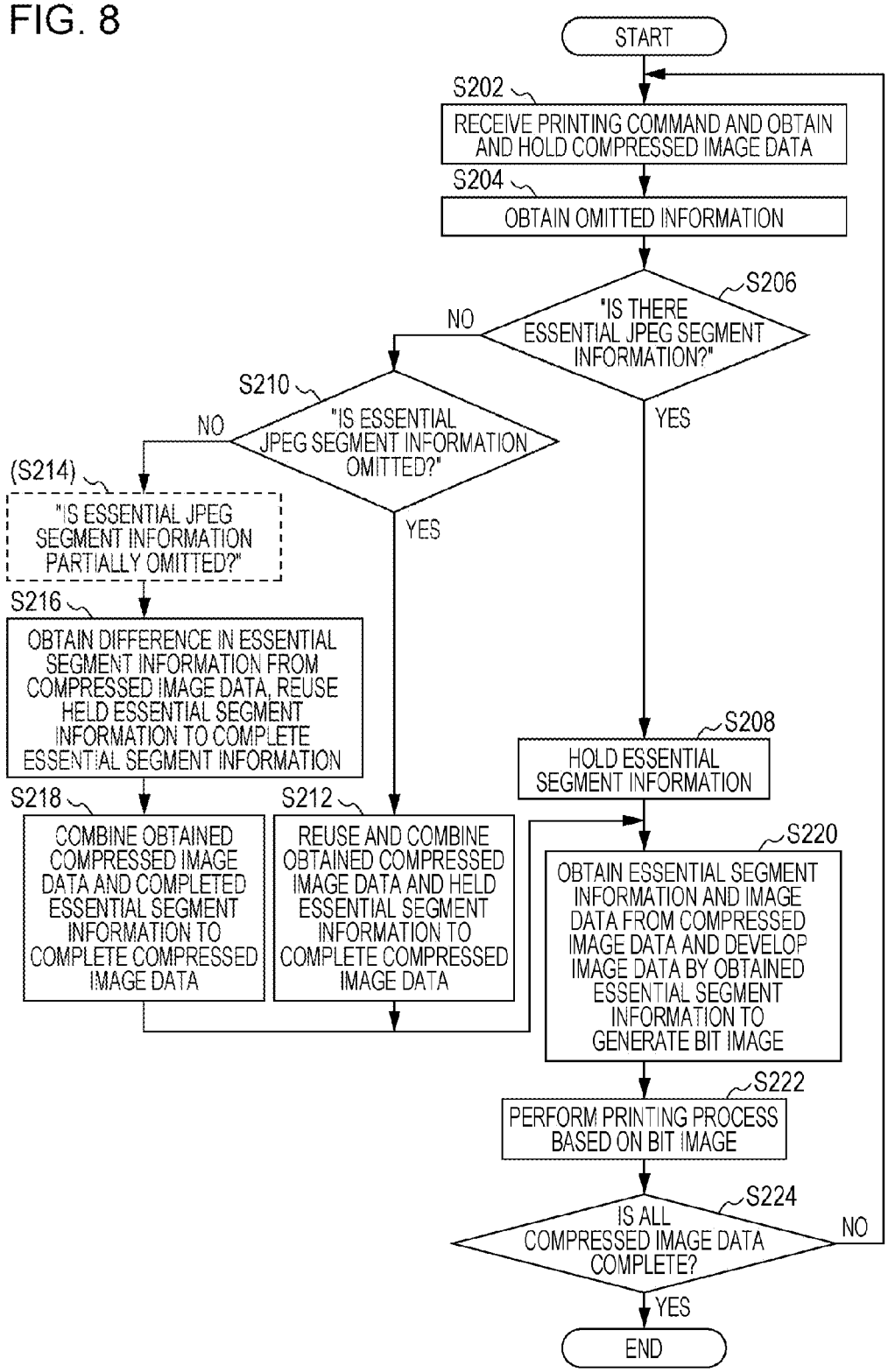
FIG. 8 is a main flowchart of a printing apparatus.

FIGS. 7 and 8 are main flowcharts of the printing control apparatus and the printing apparatus when transmitting and receiving the printing command. FIG. 7 is the main flowchart of the printing control apparatus, and FIG. 8 is the main flowchart of the printing apparatus.

Figure 12:
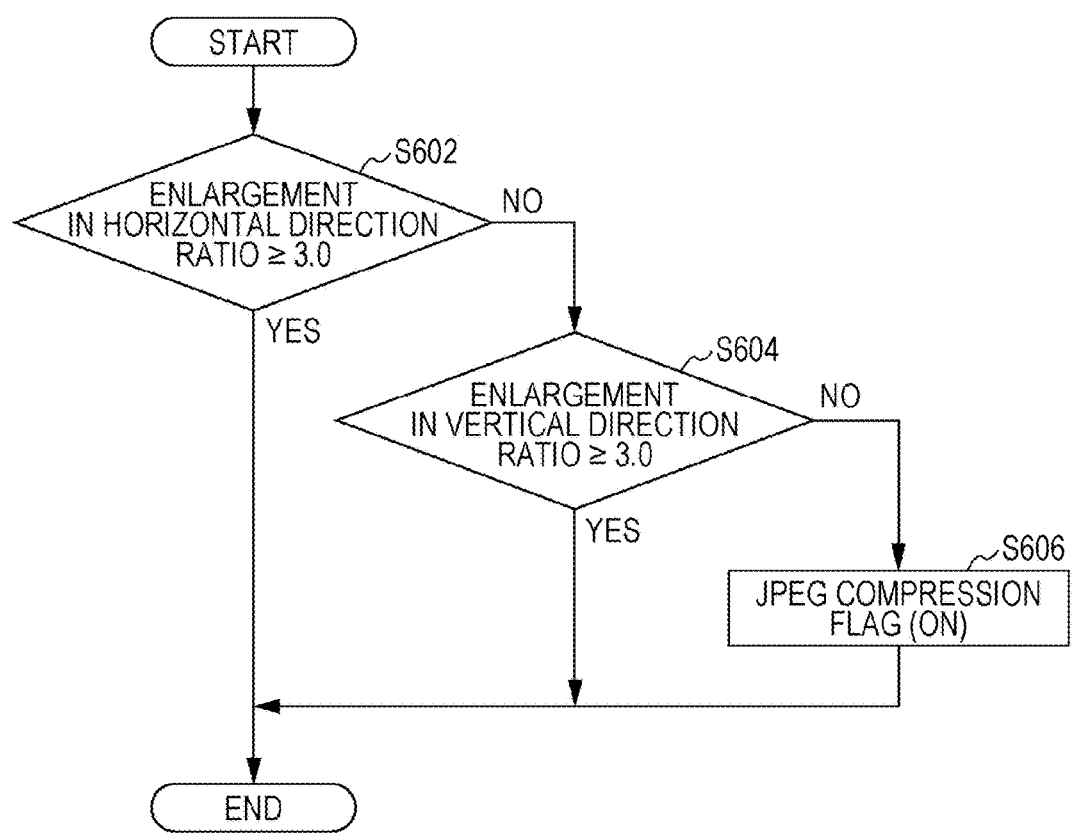
FIG. 12 is a flowchart of the compression application determination process based on enlargement ratio.

A printing command generating process 10f illustrated in the FIG. 2 corresponds to the printing control apparatus 10. The CPU 11a determines whether a JPEG compression flag is on or off in a step S102. The JPEG compression flag is a flag for performing the JPEG compression, which is lossy compression, on the bit image, and determining whether or not it is needed to omit the essential segment information according to whether or not it is possible to reuse the essential segment information. Specifically, according to the determination whether or not the condition illustrated in the drawings subsequent to FIG. 12 is satisfied, the flag is set to be on or off.

If the JPEG compression flag is on, in a step S104, compressed image data subjected to JPEG compression is obtained. Next, in a step 106, it is determined whether or not the compressed image data is the first compressed image data, and, when the compressed image data is the first compressed image data, a printing command of "there is JPEG essential segment information" is generated in a step S110.

First, the printing command provides an area in which omission of the JPEG essential segment information is set. For example, there is an area of one byte indicating a data type and compression form, and the data type is indicated in high four bits, and compression/non-compression is indicated in low four bits. In this embodiment, since there is sufficient space for allocating data in the four low bits, "there is JPEG essential segment information", "omit JPEG essential segment information", and "partially omit JPEG essential segment information" are allocated. For example, in the case of setting 0 to 2 in the low four bits, any one of the three numbers is indicated.

In the case of the first compressed image data, since, in the printing apparatus 20, the compressed image data has not been transmitted, the essential segment information to be reused does not exist in the printing apparatus 20. Therefore, it is necessary to transmit the JPEG essential segment information. For this reason, as "there is JPEG essential segment information", the compressed image data is transmitted as the JPEG compression data in the JPEG format illustrated in FIG. 3. From this format, it is understood that the compressed image data includes the essential segment information and the image data. That is, the compressed image data includes the image data subjected to lossy compression so as to be developed by using a predetermined data set, and the predetermined data set.

In addition, in a step S118, until it is determined that entire compressed image data is terminated, the steps subsequent to the step S104 are repeated.

Since, when the subsequent compressed image data is obtained in the step S104, it is determined that the subsequent compressed image data is not the first image data in step S106, the subsequent compressed image data is compared with the segment information at the previous time in a step S108. This represents comparing the essential segment information included in the compressed image data at the present time, and the essential segment information included in the compressed image data at the previous time. The compressed image data at the present time is the untransmitted compressed image data, and the compressed image data at the previous time is the transmitted compressed image data. In addition, successive compressed image data is generally used as a target.

In addition, when the essential segment information at the present time does not coincide with that of the compressed image data at the previous time, it is not possible to reuse the essential segment information at the previous time. Therefore, the essential segment information cannot be omitted, and also, the printing command of "there is JPEG essential segment information" is generated in a step S110, and, through the determination in the step S118 and the process in the step S104, the subsequent compressed image data is obtained.

Meanwhile, in many cases, when compared with the segment information at the previous time in the step S108, the JPEG essential segment information included in the compressed image data at the present time coincides with that of the previous time. Since the target is the same bit image and only the locations of the rectangular areas are different, the preconditions of compression are supposed to coincide with each other, and, in many cases, the Huffman table or the like required for compression or development coincide with each other.

For this reason, when the compressed image data is common, in a step S112, by the compressed image data, the printing command of "omit JPEG essential segment information" is generated and transmitted. That is, in the compressed image data, only the image data is included. Specifically, as illustrated in FIG. 4, the remaining JPEG compression data in which the number of the omitted bytes from the head which became possible to omit for being common is held in the two bytes in the head is transmitted as the printing command.

In addition, it is considered that a part of the essential segment information at the present time coincides with a part of the essential segment information at the previous time. For this reason, when it is determined that the part of the essential segment information at the present time coincides with the part of the essential segment information at the previous time, the difference between the pieces of essential segment information is written in the step S114, and, by the compressed image data, the printing command of "partially omit JPEG essential segment information" is generated and transmitted in a step S116. As an example of the difference, it is possible to omit only a coinciding area at the head side, and to set from the part of the essential segment information at the present time which does not coincide with the part of the essential segment information at the previous time to the last part of the essential segment information at the present time as the difference. In this case, the coinciding area with a predetermined length at the head side is not transmitted and omitted, and, along with the information of the length, the remaining data may be transmitted as the printing command. In this way, it is possible to determine the length of the essential segment information to be reused at the reception side, and to rehold the original compressed image data in addition to the essential segment information at the head of the received JPEG compression data. The compressed image data in this case includes the difference between the pieces of essential segment information and the image data.

In addition, in the step S108, the determination of comparing with the segment information at the previous time corresponds to a section for and a step of comparing a data set of essential segment information (data set) of the transmitted compressed image data to a data set of the untransmitted compressed image data when printing the bit image. In addition, in the compressed image data to be transmitted when coinciding, only the image data is included. In addition, also in the case when partially coinciding, in the compressed image data to be transmitted, the coinciding area with the predetermined length at the head side is omitted, and, along with the information of the length, the remaining data may be transmitted as the printing command. Therefore, the processes in the step S112 and the step S116 in the case of coinciding and partially coinciding correspond to a section for and a step of omitting transmission of the essential segment information (data set) in the subsequent compressed image data.

In addition, an area of one byte in which the data type and the compression form of the printing command are indicated is used, and "there is JPEG essential segment information", "omit JPEG essential segment information", and "partially omit JPEG essential segment information" are allocated. That is, the printing command includes the selection of omitting the data set. In addition, it is possible to notify the printing apparatus 20 that the data set has been omitted when the printing command is transmitted, and the processes of setting and transmitting predetermined parameters in and to the area correspond to a section for and a step of notifying the printing apparatus 20 that the data set has been omitted.

As described above, the essential segment information belongs, or is omitted and transmitted from the printing control apparatus 10 to the printing apparatus 20.

At the printing apparatus 20 side, the printing command is received, and the compressed image data is obtained and held in a step S202. Since the information of the status of omission is included in the printing command, the omission information is obtained in the step S204. That is, with reference to a value in the low four bites in an area of one byte indicating the above-described data type and the compression form, and determines any one of "there is JPEG essential segment information", "JPEG essential segment information is omitted", and "JPEG essential segment information is partially omitted".

If it can be determined as "there is JPEG essential segment information" in the step S206, the essential segment information is held in the step S208. That is, since the JPEG essential segment information is included in the compressed image data obtained in the step S202, the JPEG essential segment information is held for reuse. In addition, since the JPEG essential segment is not deficient, the compressed image data is completed, and, of the compressed image data, the essential segment information and the image data are obtained, and the bit image is generated by developing the image data with the obtained essential segment information in a step S220, and the printing process is performed based on the same bit image in a step S222. The printing is performed according to a process 20c and the processes thereafter illustrated in FIG. 2. Next, in a step S224, it is determined whether or not the entire compressed image data is terminated, and, if the data is not terminated, the steps subsequent to a step S202 are repeated.

In the step S202, when the subsequent printing command is received, the compressed image data is obtained and held. In addition, in the step S204, with reference to the predetermined four bits of the printing command, the omission information is obtained and the status of omission is determined. As described above, there is a case where the data is transmitted with the JPEG essential segment information omitted, and, if it is determined as "JPEG essential segment information is omitted" based on the omission information in the step S210, the compressed image data obtained in the step S202 at the present time, and the essential segment information obtained and held in the step S202 at the previous time are reused and combined to complete the compressed image data in a step S212. Specifically, in the two bytes in the head of the compressed image data at the present time, the number of the omitted bytes is recorded. Therefore, by the number of the bytes are obtained from the compressed image data at the previous time and combined with the remaining head except for the two byte in the head of the compressed image data at the present time to complete one piece of compressed image data. The JPEG essential segment information is obtained from the compressed image data at the previous time, and, in this sense, the JPEG essential segment information is reused. In addition, an area from the head in which the number of the bytes is designated is reused. Since the area is designated by the number of the bytes, it is possible to reuse the marker and the frame data as it is inside the area, and the process is easy to perform. This designation method may be employed, and it is also possible to maintain original separations of the marker or the frame data and to designate and reuse only the portion of the segment data in the process.

In addition, of the received printing command, there can be a command in which the omission information of "JPEG essential segment information is partially omitted" is designated. In this case, it is determined as NO both in the step S206 and the step S210, and it is determined as "JPEG essential segment information is partially omitted" in the step S214, and the difference between the pieces of the essential segment information is obtained in the step S216 from the compressed image data obtained and held in the step S202 at the present time, and the held essential segment information is reused in the step S202 before the previous time to complete the essential segment information. Next, in the step S218, the obtained compressed image data and the completed essential segment information are combined at the present time to complete the compressed image data.

Next, in the step S220, the essential segment information and the image data are obtained from the compressed image data, and the bit image is generated by developing the image data with the obtained essential segment information.

In the case where it is determined that the essential segment information is omitted in the step S210, according to the above-described process, the compressed image data including the original essential segment information is completed by reusing the held essential segment information. In addition, based on the compressed image data after completed, bit image data is generated by using the essential segment information and developing the image data.

That is, the printing apparatus 20 reuses the already existing essential segment information (data set) when it is notified that transmission of the essential segment information as the data set has been omitted, and realizes a section for and a step of generating the bit image by developing the image data of the held compressed image data. In addition, also in a general process in which transmission of the data set is not omitted, the bit image is generated by using the essential segment information (data set) and developing the image data as usual. In addition, in the step S202, a process of obtaining and holding the compressed image data corresponds to a section for and a step of holding the compressed image data from which the data set has been omitted.

As described above, even when the essential segment information is not transmitted from the printing control apparatus 10 to the printing apparatus 20, it is possible to generate the bit image by developing the image data at the printing apparatus 20 side. Thereby, as in the case of performing the printing process for every band of the page, in the case where the image is small, it is not necessary to transmit the same essential segment information repeatedly. As a result, it is possible to actually acquire high compression ratio by lossy compression. As a result, it is possible to increase the data transmission speed.

In addition, in the step S116, the printing command of "JPEG essential segment information is partially omitted" is generated and transmitted, and, in the step S214, it is determined as "JPEG essential segment information is partially omitted", and the difference between the pieces of the essential segment information and the held essential segment information are reused to complete the essential segment information.

This is, first, in response to that the printing command enables a selection of omitting the part of the data set, the process in the step S116 corresponds to a section for and a step of omitting transmission of the part of the data set in the compressed image data, and, the step S218 and the step S220 correspond to a section for and a step for generating the bit image by reusing the data set that is transmitted at the present time and the part of the transmitted data set and developing the held compressed image data.

Meanwhile, in the example described above, the printing command is generated from where the essential segment information has been omitted. However, with assuming the reusing of the data set, the printing command including only the essential segment information as the data set is generated from the printing control apparatus 10 and transmitted to the printing apparatus 20, and when the printing apparatus 20 receives the printing command in the step S202, the printing apparatus 20 may obtain and keep the essential segment information of the compressed image data. In the case where, in this manner, the essential segment information is held, if it is notified as "JPEG essential segment information is omitted", as described above, the compressed image data may be completed by reusing the held essential segment information in the compressed image data at the present time.

Meanwhile, in the step 106, in the case of the first compressed image data, it is processed as "there is JPEG essential segment information". Since there is no JPEG essential segment yet at the printing apparatus 20 side, it is presumed that it also cannot be reused.

However, in many cases, the Huffman table for quantization in JPEG compression does not change. Therefore, as long as the versatile JPEG essential segment information is recorded in advance in the ROM 21b or the RAM 21c of the printing apparatus 20, it is possible to reuse the versatile JPEG essential segment information even in the case of the first compressed image data.

In this case, the printing apparatus 20 includes the JPEG essential segment information as a predetermined data set, and the printing control apparatus 10 compares, instead of the step S108, the JPEG essential segment information (data set) of the compressed image data subjected to the JPEG compression process (lossy compression process), and the JPEG essential segment information (data set) included in the printing apparatus 20, and, when the data sets coincide with each other, the JPEG essential segment information (transmission of data set) in the compressed image data may be omitted, as with the step S112.

As described above, in the case where the printing process is performed for every band of the page while it is presumed to reuse the essential segment information, there is a case where the improvement of the data transmission speed cannot be expected integrally by applying JPEG compression, or even a case where the required data transmission speed is obtained without applying JPEG compression. In addition, there is also a case where lossy compression is insufficient in picture quality. For this reason, in advance, it is determined whether or not to apply JPEG compression, and the result thereof is reflected in the JPEG compression flag.

Figure 9:
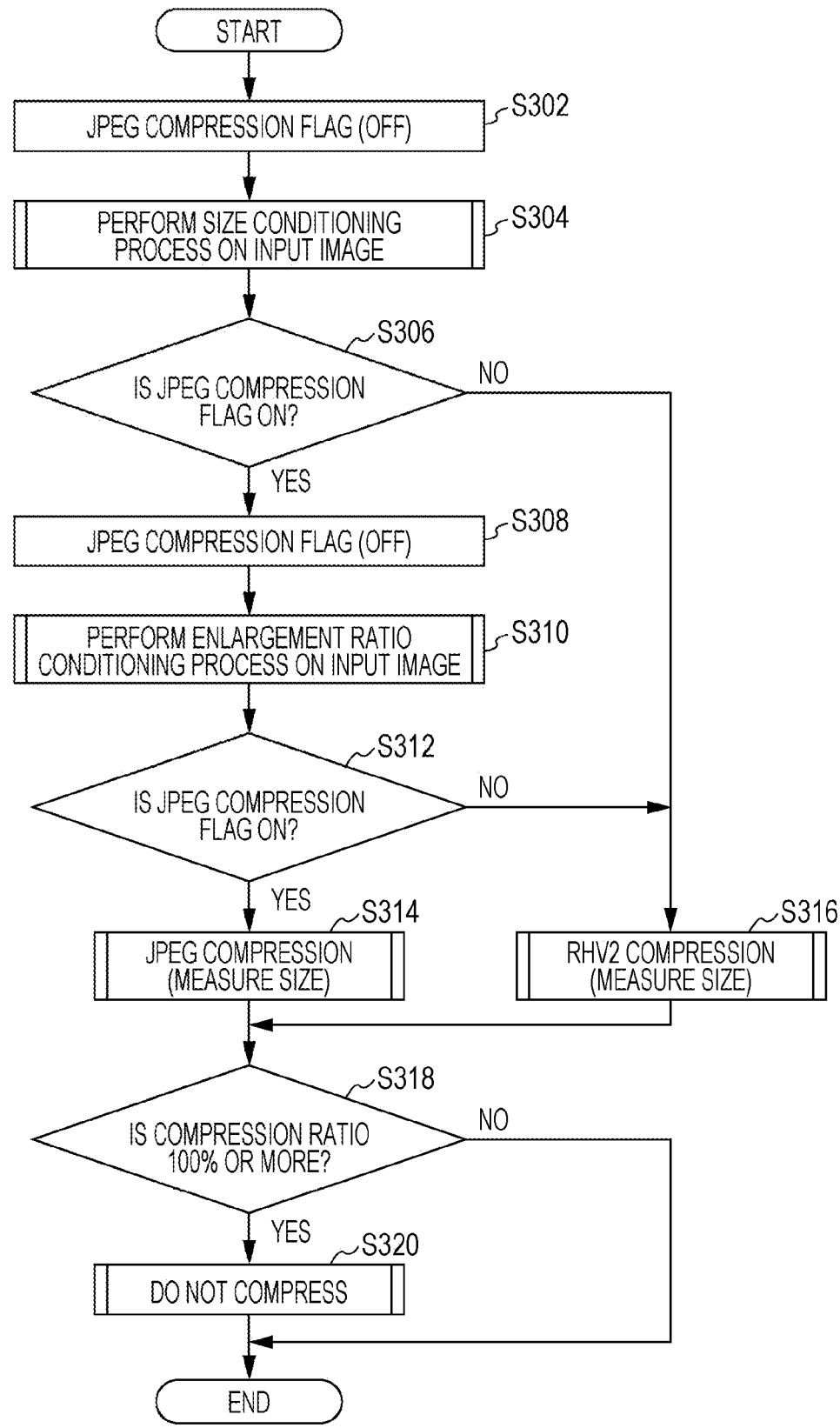
FIG. 9 is a flowchart of a process which determines whether or not to apply JPEG compression.

FIG. 9 is the flowchart of the process which determines whether or not to apply JPEG compression.

In this embodiment, as the condition for not applying JPEG compression, the following conditions are set: (1) size of the input image, (2) input image enlargement ratio, (3) compression ratio at 100% or more, and (4) other conditions. In the flowchart illustrated in FIG. 9, the following conditions are determined: (1) size of the input image, (2) input image enlargement ratio, and (3) compression ratio at 100% or more.

Figure 10:
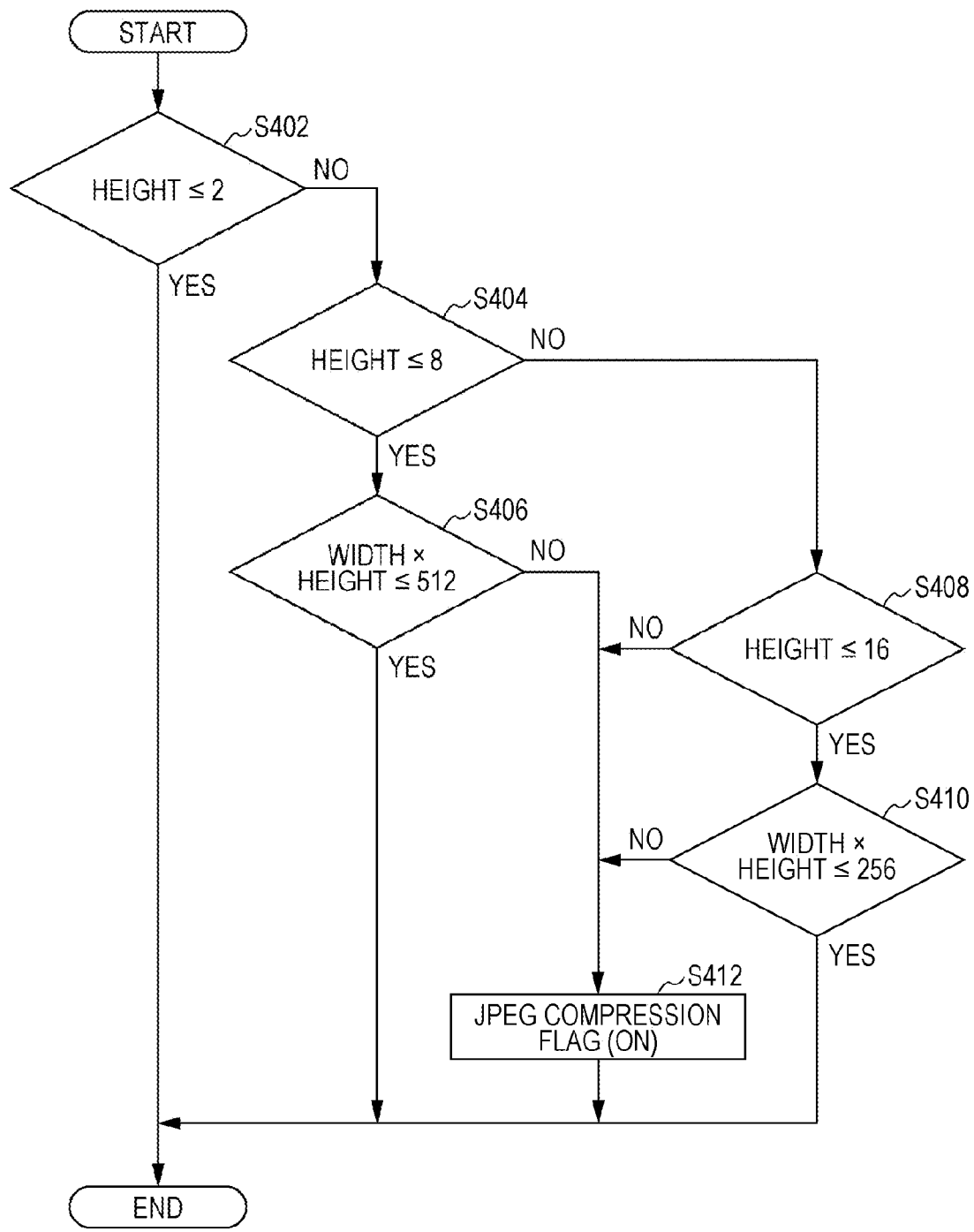
FIG. 10 is a flowchart of a compression application determination process based on the size of an input image.
Figure 11:
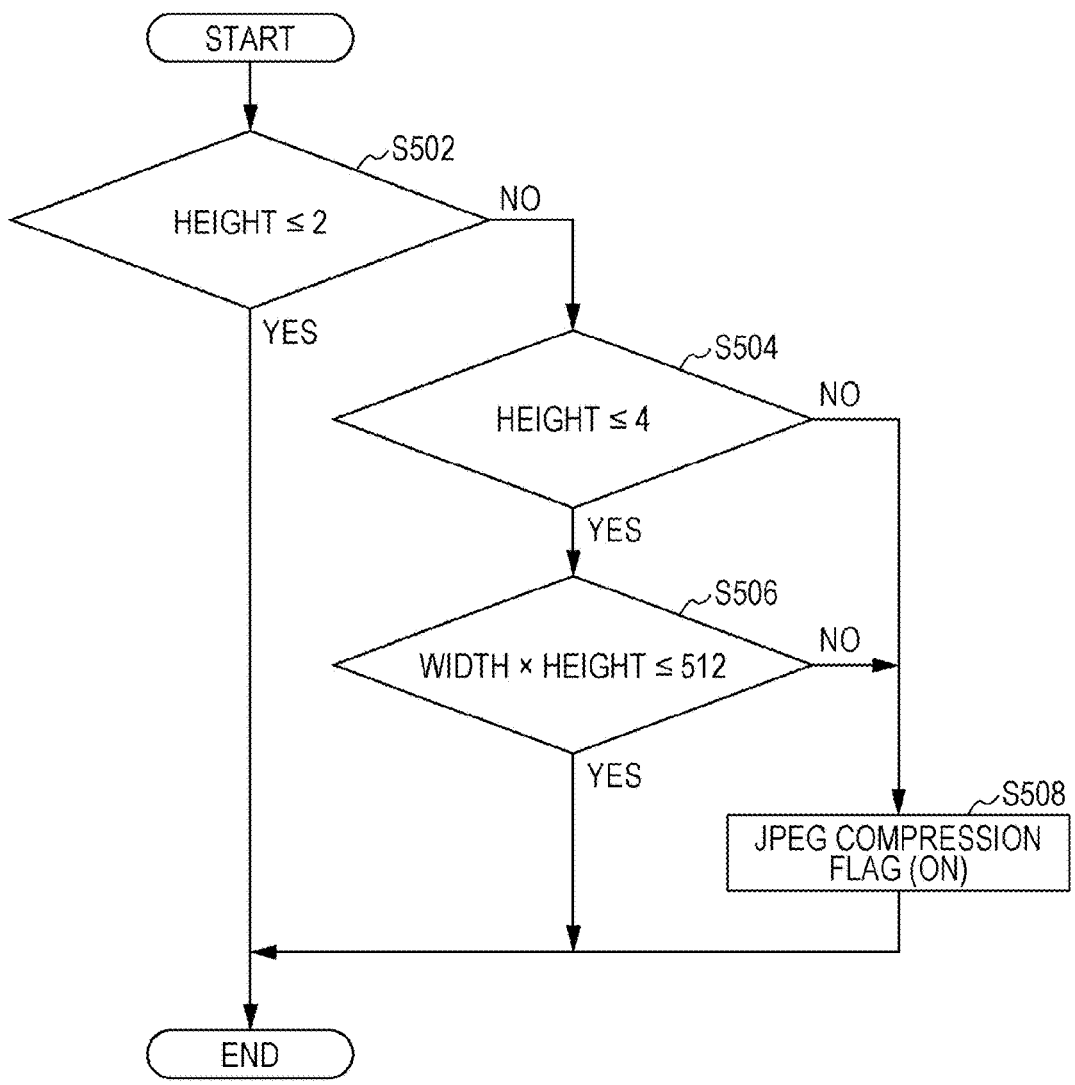
FIG. 11 is a flowchart of the compression application determination process based on the size of the input image.

At the exact time when staring the process, as a default value, the JPEG compression flag is set to off in the step S302, and the size conditioning process on an input image illustrated in FIG. 10 or that illustrated in FIG. 11 is performed in a step S304.

FIG. 10 is the flowchart of the compression application determination process (size conditioning process on an input image) based on the size of the input image.

In this process, it is presumed that the JPEG essential segment information is added for every compression unit, and when
(1) the number of pixels in the vertical direction is two or less,
(2) the number of pixels in the vertical direction is eight or less, and the total number of the pixels is 512 or less, or
(3) the number of pixels in the vertical direction is 16 or less, and the total number of the pixels is 256 or less, since the size of the input image is small, and, by being subjected to JPEG compression, becomes bigger than the size of the original image, the condition for not applying JPEG compression is determined.

In the step S402, it is determined whether the height is two pixels or less. If the height is two pixels or less, with the JPEG compression flag off, the condition determination process is terminated.

If the height exceeds two pixels, it is determined whether or not the height is eight pixels or less in a step S404, and, in the case where the height is eight pixels or less, it is determined whether or not the total number of the pixels (width×height) is 512 or less in a step S406. If the total number of the pixels (width×height) is 512 or less, with the JPEG compression flag off, the condition determination process is terminated.

If the height exceeds eight pixels, it is determined whether or not the height is 16 pixels or less in a step S408, and, in the case where the height is 16 pixels or less, it is determined whether or not the total number of the pixels (width×height) is 256 or less in a step S410. If the total number of the pixels (width×height) is 256 or less, with the JPEG compression flag off, the condition determination process is terminated.

In the case where the above condition are not satisfied, with the JPEG compression flag in a step S412 on, the condition determination process is terminated.

That is, it is determined whether or not the bit image subjected to the printing process for every band of the page satisfies a predetermined condition, and, in the case where the condition for JPEG compression is satisfied, the compressed image data subjected to the lossy compression process is transmitted to the printing apparatus.

FIG. 11 is the flowchart of the compression application determination process (input image sizing condition process) based on the different sizes of the input image.

In this process, it is presumed that the JPEG essential segment information is not added for every compression unit, and when
(1) the number of pixels in the vertical direction is two or less, or
(2) the number of pixels in the vertical direction is 4 or less, and the total number of the pixels is 512 or less, since the size of the input image is small, and, by being subjected to JPEG compression, becomes bigger than the size of the original image, the condition for not applying JPEG compression is determined.

In a step S502, it is determined whether the height is two pixels or less. If the height is two pixels or less, with the JPEG compression flag off, the condition determination process is terminated.

If the height exceeds two pixels, it is determined whether or not the height is four pixels or less in a step S504, and, in the case where the height is four pixels or less, it is determined whether or not the total number of the pixels (width×height) is 512 or less in a step S506. If the total number of the pixels (width×height) is 512 or less, with the JPEG compression flag off, the condition determination process is terminated.

In the case where the above condition are not satisfied, with the JPEG compression flag in a step S508 on, the condition determination process is terminated.

That is, it is determined whether or not the bit image subjected to the printing process for every band of the page satisfies a predetermined condition, and, in the case where the condition for JPEG compression is satisfied, the compressed image data subjected to lossy compression process is transmitted to the printing apparatus.

If the condition determination process in FIGS. 10 and 11 is terminated, the procedure returns to the process illustrated in FIG. 9. The JPEG compression flag after the above processes is determined in a step S306, and if the JPEG compression flag remains to be off, the repeated Huffman compression process (RHV2) as the lossless compression process is performed instead of JPEG compression in a step S316.

Meanwhile, also in the case where JPEG compression is not excluded by the determination process based on the input image size, since an enlargement ratio conditioning process on an input image is on an input image in a step S310, the enlargement ratio conditioning process on a input image illustrated in FIG. 12 is performed in the step S310 after the default value of the JPEG compression flag is set to off in advance in the step S308.

FIG. 12 is the flowchart of the compression application determination process based on enlargement ratio.

According to the number of pixels of the input image, it is required for performing an enlarging process in advance. As illustrated in FIG. 6, there is also a case where the enlargement is required when printing. However, in the case where, due to the enlargement process, the image is enlarged by a magnification greater than a predetermined magnification, it is not possible to allow the deterioration of the image quality eventually, when the image is transmitted after being subjected to JPEG compression.

For this reason, when the enlargement ratio in the horizontal direction is three times or more, and the enlargement ratio in the vertical direction is three or more, the condition for not applying JPEG compression is determined.

First, in a step S602, it is determined whether or not the enlargement ratio in the horizontal direction is three times or more, and if the enlargement ratio in the horizontal direction is three times or more, with the JPEG compression flag off, the condition determination process is terminated.

Next, in a case where the enlargement ratio in the horizontal direction is not three times or more, it is determined whether or not the enlargement ratio in the vertical direction is three times or more in a step S604, and if the enlargement ratio in the vertical direction is three or more, with the JPEG compression flag off, the condition determination process is terminated.

In addition, only when the enlargement ratio in the horizontal direction and in the vertical direction is not three times or more, with the JPEG compression flag in a step S606 on, the condition determination process is terminated.

If the condition determination process in FIG. 12 is terminated, the procedure returns to the process illustrated in FIG. 9. The JPEG compression flag after the above processes is determined in a step S312, and if the JPEG compression flag remains to be off, the repeated Huffman compression process (RHV2) as the lossless compression process is performed instead of JPEG compression in a step S316.

However, if the JPEG compression flag is set to on through the condition determination processes illustrated in FIGS. 10 to 12, JPEG compression as the lossy compression process is performed in a step S314.

Also in the case where the repeated Huffman compression process (RHV2) as the lossless compression process is performed in the step S316, and in the case where the JEPG compression as the lossy compression process is performed in the step S314, the compression ratio is computed. That is, the ratio of the file size before compression to the image size after compression is the compression ratio. If the compression ratio exceeds 100%, the compression is actually not performed.

By using the result, it is determined whether or not the compression ratio is 100% or more in a step S318. Since, if the compression ratio is 100% or more, the file size is smaller when the compression is not performed, and thereby the image is not compressed by any method in a step S320.

In other condition determination process, for example, it is determined whether or not "exclusive paper mode" for high-quality printing is set as the setting of a printing condition. In the case when the condition is set as "exclusive paper mode", since it can be determined that the image quality is considered important, lossless compression, where the deterioration of the image quality does not occur, is selected. In addition, in the case where the image quality is considered important, an increase in the printing time as compensation for the image quality is allowed. For this reason, JPEG compression is not performed.

Figure 13:
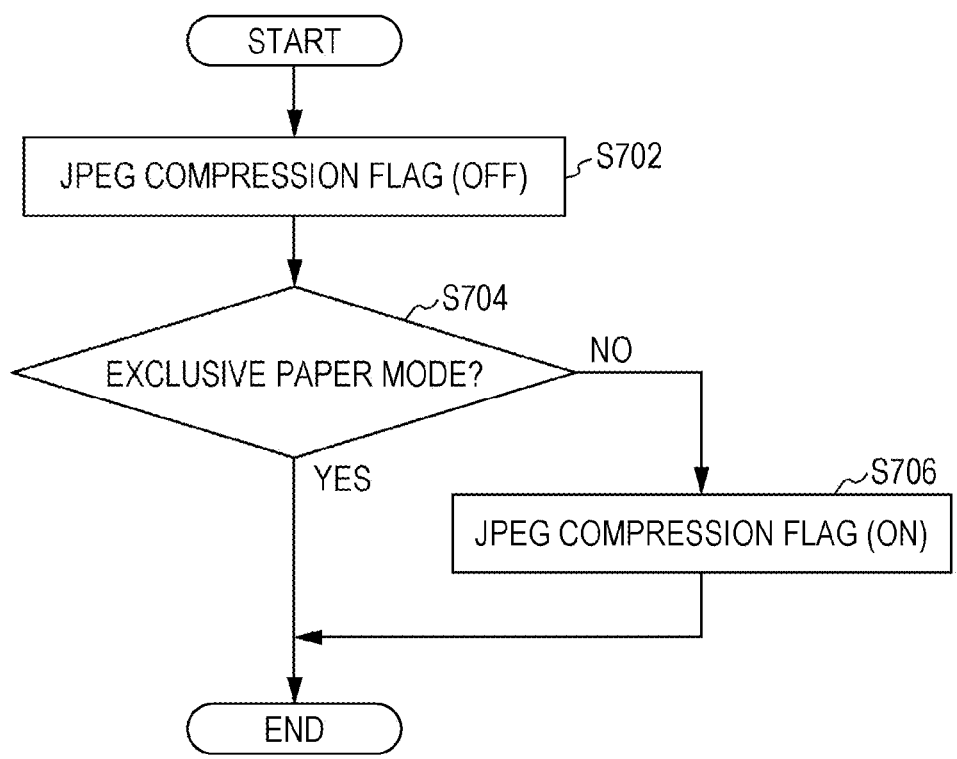
FIG. 13 is a flowchart of the compression application determination process based on other conditions.

Next, FIG. 13 is the flowchart of the compression application determination process based on other conditions.

After the default value of the JPEG compression flag is set to off in the step S702, it is determined whether or not the "exclusive paper mode" is set in a step S704. The exclusive paper mode is a kind of printing parameters, and it is possible to determine whether the exclusive paper mode is set in the printing control apparatus 10. In addition, if the exclusive paper mode is set, with the JPEG compression flag off, the condition determination process is terminated.

Meanwhile, if the "exclusive paper mode" is not set, with the JPEG compression flag in a step S706 on, the condition determination process is terminated.

The JPEG compression flag is set to on or off according to the above-described processes, and the same JPEG compression flag is referred to in a step S102 illustrated in FIG. 7.

Thereby, the printing control apparatus 10 determines whether the bit image as the input image satisfies a predetermined condition when the printing process is performed for every band of the page, and, in the case where the condition for the lossy compression process is satisfied, the compressed image data subjected to the lossy compression process is transmitted to the printing apparatus.

As described above, the invention is not only established as the printing system configured by the printing control apparatus 10 and the printing apparatus 20, and the invention is established with the printing control apparatus 10 or the printing apparatus 20 independently. In addition, focusing on each procedure according to which the printing system is actually performed, the invention is also established as a printing method. Moreover, since each procedure is realized, and each a section and step is realized as a predetermined function in a computer, the invention is also established as a printing program.

In addition, it is needless to say that the invention is not limited to the embodiment. It is also needless to say for the person skilled in the art, however, the following contents are disclosed as one embodiment of the invention:

Material or configurations disclosed in the embodiment and can be replaced with each other are applied by suitably changing the combination thereof.

Material or configurations not disclosed in the embodiment, but included in the prior art and can be replaced with the material or the configurations disclosed in the embodiment are suitably replaced and applied by changing the combination thereof.

Material or configurations not disclosed in the embodiment, but can be assumed as the replacement of the material or configurations disclosed in the embodiment by the person skilled in the art based on the prior art are suitably replaced and applied by changing the combination thereof.

The entire disclosure of Japanese Patent Application No. 2015-022981, filed Feb. 9, 2015 is expressly incorporated by reference herein.

What is claimed is:

1. A printing system that outputs a printing command from a printing control apparatus to a printing apparatus,
wherein, a printing process is performed for each band of a page on a bit image,
compressed image data is transmitted from the printing control apparatus to the printing apparatus in response to the bit image,
the compressed image data includes image data subjected to lossy compression so as to be developed by using a predetermined data set, and the predetermined data set, the printing command includes a selection of omitting the predetermined data set,
the printing control apparatus includes a processor to:
compare a transmitted data set of the transmitted compressed image data to a untransmitted data set of the untransmitted compressed image data when printing the bit image,
omit transmission of the untransmitted data set in the subsequent compressed image data when the data sets coincide with each other, and
notify the printing apparatus that transmission of the untransmitted data set has been omitted, and
the printing apparatus includes a central processing unit (CPU) to:
hold the compressed image data in which the untransmitted data set has been omitted, and
generate the bit image by developing the image data of the held compressed image data by reusing an already existing data set when it is notified that the transmission of the untransmitted data set has been omitted.

2. The printing system according to claim 1, wherein the printing command enables a selection of omitting a part of the data set,
the printing control apparatus includes the processor to omit transmission of a part of the untransmitted data set in the subsequent compressed image data when the part of the untransmitted data set in the transmitted compressed image data and the part of the untransmitted data set in the untransmitted compressed image data which have been subjected to the lossy compression process, coincide with each other, and
the printing apparatus includes the central processing unit (CPU) to
hold the compressed image data in which the untransmitted data set is omitted, and
generate the bit image by developing the held compressed image data by reusing a part of the already existing data set which is to be transmitted and the part of the transmitted data set when it is notified that transmission of the part of the untransmitted data set has been omitted.

3. The printing system according to claim 1, wherein the printing apparatus includes the already existing data set, and
the printing control apparatus compares the untransmitted data set of the compressed image data subjected to the lossy compression process, and the already existing data set included in the printing apparatus, and, when the untransmitted data set and the already existing data sets coincide, omits transmission of the untransmitted data set in the compressed image data.

4. The printing system according to claim 1,
wherein the printing control apparatus determines whether the bit image subjected to the printing process for every band of the page satisfies a predetermined condition, and, in the case where the condition is satisfied, transmits the compressed image data subjected to the lossy compression process to the printing apparatus.

5. A printing apparatus connected to a printing control apparatus that prints by receiving a printing command from the printing control apparatus,
wherein, a printing process is performed for each band of a page on a bit image,
the compressed image data is received in response to the bit image,
the compressed image data includes image data subjected to lossy compression so as to be developed by using a predetermined data set, and the predetermined data set,
the printing command includes a selection of omitting untransmitted data set, and
wherein the printing control apparatus includes a processor to:
compare a transmitted data set of the transmitted compressed image data to the untransmitted data set of a untransmitted compressed image data when printing the bit image,
omit transmission of the untransmitted data set in the subsequent compressed image data when the transmitted and untransmitted data sets coincide with each other, and
notify the printing apparatus that transmission of the untransmitted data set has been omitted, and
the printing apparatus comprises a central processing unit (CPU) to:
hold the compressed image data in which the untransmitted data set has been omitted, and
generate the bit image by developing the image data of the held compressed image data by reusing an already existing data set when it is notified that the transmission of the untransmitted data set has been omitted.

6. A printing method that outputs a printing command from a printing control apparatus to a printing apparatus,
wherein, a printing process is performed for each band of a page on a bit image,
the compressed image data is transmitted from the printing control apparatus to the printing apparatus in response to the bit image,
the compressed image data includes image data subjected to lossy compression so as to be developed by using a predetermined data set, and the predetermined data set,
the printing command includes a selection of omitting the data set, and
the method comprises:
at the printing control apparatus,
comparing, by a processor, a transmitted data set of the compressed image data to a data set of untransmitted compressed image data,
omitting, by the processor, transmission of the untransmitted data set in the subsequent compressed image data when the transmitted and untransmitted data sets coincide with each other, and
notifying the printing apparatus that transmission of the untransmitted data set has been omitted; and
at the printing apparatus,
holding, by a central processing unit (CPU), the compressed image data in which the untransmitted data set has been omitted, and
generating, by the CPU of the printing apparatus, the bit image by developing the image data of the held compressed image data by reusing an already existing data set when it is notified that transmission of the untransmitted data set has been omitted.

* * * * *